(12) United States Patent
Blanco et al.

(10) Patent No.: US 10,255,309 B2
(45) Date of Patent: Apr. 9, 2019

(54) VERSIONED INSERT ONLY HASH TABLE FOR IN-MEMORY COLUMNAR STORES

(71) Applicants: Rolando Blanco, Ontario (CA); Ivan Schreter, Malsch (DE); Thomas Legler, Walldorf (DE)

(72) Inventors: Rolando Blanco, Ontario (CA); Ivan Schreter, Malsch (DE); Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 1026 days.

(21) Appl. No.: 14/553,654

(22) Filed: Nov. 25, 2014

(65) Prior Publication Data
US 2016/0147750 A1    May 26, 2016

(51) Int. Cl.
*G06F 17/30*    (2006.01)

(52) U.S. Cl.
CPC .. *G06F 17/30315* (2013.01); *G06F 17/30324* (2013.01)

(58) Field of Classification Search
USPC ........................................................ 707/747
See application file for complete search history.

(56) References Cited

U.S. PATENT DOCUMENTS

| | | |
|---|---|---|
| 5,222,235 A | 6/1993 | Hintz et al. |
| 5,280,612 A | 1/1994 | Lorie et al. |
| 5,594,898 A | 1/1997 | Dalal et al. |
| 5,701,480 A | 12/1997 | Raz |
| 5,717,919 A | 2/1998 | Kodavalla et al. |
| 5,758,145 A | 5/1998 | Bhargava et al. |
| 5,794,229 A | 8/1998 | French et al. |
| 5,870,758 A | 2/1999 | Bamford et al. |
| 5,933,833 A | 8/1999 | Musashi |

(Continued)

FOREIGN PATENT DOCUMENTS

| | | |
|---|---|---|
| EP | 2778961 A1 | 9/2014 |
| WO | WO-01/29690 A2 | 4/2001 |

OTHER PUBLICATIONS

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

(Continued)

*Primary Examiner* — Muluemebet Gurmu
(74) *Attorney, Agent, or Firm* — Mintz Levin Cohn Ferris Glovsky and Popeo, P.C.

(57) ABSTRACT

At least one read operation is concurrently performed with at least one write operation that each insert a key/value pair into a backing array of a backing hash table of a hash table forming part of a columnar in-memory database. The backing array maps a plurality of pointers each to a respective bucket. Each bucket includes at least one state bit and a hashed value of a corresponding key. Thereafter, for each write operation, a first available position in the backing array at which a pointer to a new bucket containing the key/value pair can be inserted is iteratively determined (such that each first available position has no corresponding pre-existing pointer). Subsequently, for each write operation, the pointer to the new bucket containing the key/value pair is inserted at the corresponding first determined position in the backing array. Related apparatus, systems, techniques and articles are also described.

19 Claims, 12 Drawing Sheets

(56) References Cited

U.S. PATENT DOCUMENTS

| | | | |
|---|---|---|---|
| 6,070,165 A | 5/2000 | Whitmore |
| 6,275,830 B1 | 8/2001 | Muthukkaruppan et al. |
| 6,282,605 B1 | 8/2001 | Moore |
| 6,397,227 B1 | 5/2002 | Klein et al. |
| 6,453,313 B1 | 9/2002 | Klein et al. |
| 6,490,670 B1 | 12/2002 | Coffins et al. |
| 6,567,407 B1 | 5/2003 | Mizukoshi |
| 6,606,617 B1 | 8/2003 | Bonner et al. |
| 6,668,263 B1 | 12/2003 | Cranston et al. |
| 6,754,653 B2 | 6/2004 | Bonner et al. |
| 6,865,577 B1 | 3/2005 | Sereda |
| 7,698,712 B2 | 4/2010 | Schreter |
| 7,761,434 B2 | 7/2010 | Surtani et al. |
| 8,024,296 B1 | 9/2011 | Gopinathan et al. |
| 8,161,024 B2 | 4/2012 | Renkes et al. |
| 8,170,981 B1 | 5/2012 | Tewksbary |
| 8,224,860 B2 | 7/2012 | Starkey |
| 8,364,648 B1 | 1/2013 | Sim-Tang |
| 8,510,344 B1 | 8/2013 | Briggs et al. |
| 8,650,583 B2 | 2/2014 | Schreter |
| 8,732,139 B2 | 5/2014 | Schreter |
| 8,768,891 B2 | 7/2014 | Schreter |
| 8,868,506 B1 | 10/2014 | Bhargava et al. |
| 9,058,268 B1 | 6/2015 | Ostiguy et al. |
| 9,098,522 B2 | 8/2015 | Lee et al. |
| 9,141,435 B2 | 9/2015 | Wein |
| 9,262,330 B2 | 2/2016 | Muthukumarasamy |
| 9,268,810 B2 | 2/2016 | Andrei et al. |
| 9,275,095 B2 | 3/2016 | Bhattacharjee et al. |
| 9,275,097 B2 | 3/2016 | DeLaFranier et al. |
| 9,305,046 B2 | 4/2016 | Bhattacharjee et al. |
| 9,372,743 B1 | 6/2016 | Sethi et al. |
| 9,430,274 B2 | 8/2016 | Zhang |
| 9,489,409 B2 | 11/2016 | Sharique et al. |
| 9,645,844 B2 | 5/2017 | Zhang |
| 9,665,609 B2 | 5/2017 | Andrei et al. |
| 9,811,577 B2 | 11/2017 | Martin et al. |
| 2001/0051944 A1 | 12/2001 | Lim et al. |
| 2002/0107837 A1 | 8/2002 | Osborne et al. |
| 2002/0156798 A1 | 10/2002 | Larue et al. |
| 2003/0028551 A1 | 2/2003 | Sutherland |
| 2003/0065652 A1 | 4/2003 | Spacey |
| 2003/0204534 A1 | 10/2003 | Hopeman et al. |
| 2003/0217075 A1 | 11/2003 | Nakano et al. |
| 2004/0034616 A1 | 2/2004 | Witkowski et al. |
| 2004/0054644 A1 | 3/2004 | Ganesh et al. |
| 2004/0064601 A1 | 4/2004 | Swanberg |
| 2004/0249838 A1 | 12/2004 | Hinshaw et al. |
| 2005/0027692 A1 | 2/2005 | Shyam et al. |
| 2005/0097266 A1 | 5/2005 | Factor et al. |
| 2005/0234868 A1 | 10/2005 | Terek et al. |
| 2006/0004833 A1 | 1/2006 | Trivedi et al. |
| 2006/0005191 A1* | 1/2006 | Boehm ............... G06F 9/52 |
| | | 718/100 |
| 2006/0036655 A1 | 2/2006 | Lastovica |
| 2006/0206489 A1 | 9/2006 | Finnie et al. |
| 2007/0192360 A1 | 8/2007 | Prahlad et al. |
| 2008/0046444 A1 | 2/2008 | Fachan et al. |
| 2008/0183958 A1* | 7/2008 | Cheriton ............ G06F 12/0223 |
| | | 711/108 |
| 2008/0247729 A1 | 10/2008 | Park |
| 2009/0064160 A1 | 3/2009 | Larson et al. |
| 2009/0080523 A1 | 3/2009 | McDowell |
| 2009/0094236 A1 | 4/2009 | Renkes et al. |
| 2009/0254532 A1 | 10/2009 | Yang et al. |
| 2009/0287703 A1 | 11/2009 | Furuya |
| 2009/0287737 A1 | 11/2009 | Hammerly |
| 2010/0008309 A1 | 1/2010 | Cheng et al. |
| 2010/0082545 A1 | 4/2010 | Bhattacharjee et al. |
| 2010/0241812 A1* | 9/2010 | Bekoou ............... G06F 9/526 |
| | | 711/141 |
| 2010/0281005 A1 | 11/2010 | Carlin et al. |
| 2010/0287143 A1 | 11/2010 | Di Carlo et al. |
| 2011/0010330 A1 | 1/2011 | McCline et al. |
| 2011/0060726 A1 | 3/2011 | Idicula et al. |
| 2011/0087854 A1 | 4/2011 | Rushworth et al. |
| 2011/0145835 A1 | 6/2011 | Rodrigues et al. |
| 2011/0153566 A1 | 6/2011 | Larson et al. |
| 2011/0252000 A1 | 10/2011 | Diaconu et al. |
| 2011/0270809 A1 | 11/2011 | Dinkar et al. |
| 2011/0276744 A1* | 11/2011 | Sengupta ............ G06F 12/0866 |
| | | 711/103 |
| 2011/0302143 A1 | 12/2011 | Lomet |
| 2012/0011106 A1 | 1/2012 | Reid et al. |
| 2012/0047126 A1 | 2/2012 | Branscome et al. |
| 2012/0102006 A1 | 4/2012 | Larson et al. |
| 2012/0137081 A1 | 5/2012 | Shea |
| 2012/0179877 A1 | 7/2012 | Shriraman et al. |
| 2012/0191696 A1 | 7/2012 | Renkes et al. |
| 2012/0221528 A1 | 8/2012 | Renkes et al. |
| 2012/0233438 A1 | 9/2012 | Bak et al. |
| 2012/0265728 A1 | 10/2012 | Plattner et al. |
| 2012/0284228 A1 | 11/2012 | Ghosh et al. |
| 2013/0054936 A1 | 2/2013 | Davis |
| 2013/0091162 A1 | 4/2013 | Lewak |
| 2013/0097135 A1 | 4/2013 | Goldberg |
| 2013/0103655 A1 | 4/2013 | Fanghaenel et al. |
| 2013/0117247 A1 | 5/2013 | Schreter et al. |
| 2013/0166566 A1 | 6/2013 | Lemke et al. |
| 2013/0346378 A1 | 12/2013 | Tsirogiannis et al. |
| 2014/0025651 A1 | 1/2014 | Schreter |
| 2014/0101093 A1 | 4/2014 | Lanphear et al. |
| 2014/0136571 A1 | 5/2014 | Bonvin et al. |
| 2014/0214334 A1 | 7/2014 | Plattner et al. |
| 2014/0222418 A1 | 8/2014 | Richtarsky et al. |
| 2014/0279930 A1 | 9/2014 | Gupta et al. |
| 2014/0279961 A1 | 9/2014 | Schreter et al. |
| 2015/0039573 A1 | 2/2015 | Bhattacharjee et al. |
| 2015/0089125 A1 | 3/2015 | Mukherjee et al. |
| 2015/0113026 A1 | 4/2015 | Sharique et al. |
| 2015/0142819 A1 | 5/2015 | Florendo et al. |
| 2015/0193264 A1 | 7/2015 | Hutton et al. |
| 2015/0261805 A1 | 9/2015 | Lee et al. |
| 2015/0278281 A1 | 10/2015 | Zhang |
| 2016/0103860 A1 | 4/2016 | Bhattacharjee et al. |
| 2016/0125022 A1 | 5/2016 | Rider et al. |
| 2016/0147445 A1 | 5/2016 | Schreter et al. |
| 2016/0147447 A1 | 5/2016 | Blanco et al. |
| 2016/0147448 A1 | 5/2016 | Schreter et al. |
| 2016/0147449 A1 | 5/2016 | Andrei et al. |
| 2016/0147457 A1 | 5/2016 | Legler et al. |
| 2016/0147459 A1 | 5/2016 | Wein et al. |
| 2016/0147617 A1 | 5/2016 | Lee et al. |
| 2016/0147618 A1 | 5/2016 | Lee et al. |
| 2016/0147776 A1 | 5/2016 | Florendo et al. |
| 2016/0147778 A1 | 5/2016 | Schreter et al. |
| 2016/0147786 A1 | 5/2016 | Andrei et al. |
| 2016/0147801 A1 | 5/2016 | Wein et al. |
| 2016/0147804 A1 | 5/2016 | Wein et al. |
| 2016/0147806 A1 | 5/2016 | Blanco et al. |
| 2016/0147808 A1 | 5/2016 | Schreter et al. |
| 2016/0147809 A1 | 5/2016 | Schreter et al. |
| 2016/0147811 A1 | 5/2016 | Eluri et al. |
| 2016/0147812 A1 | 5/2016 | Andrei et al. |
| 2016/0147813 A1 | 5/2016 | Lee et al. |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al |
| 2016/0147861 A1 | 5/2016 | Schreter et al. |
| 2016/0147862 A1 | 5/2016 | Schreter et al. |
| 2016/0147904 A1 | 5/2016 | Wein et al. |
| 2016/0147906 A1 | 5/2016 | Schreter et al. |

OTHER PUBLICATIONS

"HANA database lectures—Outline Part 1 Motivation—Why main memory processing." Mar. 2014 (Mar. 2014). XP055197666. Web. Jun. 23, 2015. 81 pages.; URL:http://cse.yeditepe.edu.tr/-odemir/spring2014/cse415/HanaDatabase.pdf;.

(56) References Cited

OTHER PUBLICATIONS

"HANA Persistence: Shadow Pages." Jun. 2013. Yeditepe Üniversitesi Bilgisayar Mühendisliği Bölümü. Web. Apr. 21, 2016. 32 pages. <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014, Web. Mar. 3, 2016. pp. 1-3.

Brown, E. et al. "Fast Incremental indexing for Full-Text Information Retrieval." VLDB '94 Proceedings of the 20th International Conference on Very Large Data Bases. San Francisco: Morgan Kaufmann, 1994. pp. 1-11.

Jens Krueger et al. "Main Memory Databases for Enterprise Applications." Industrial Engineering and Engineering Management (IE&EM), 2011 IEEE 18th International Conference On, IEEE, Sep. 3, 2011 (Sep. 3, 2011), pp. 547-557, XP032056073.

Lemke, Christian, et al. "Speeding Up Queries in Column Stores." Data Warehousing and Knowledge Discovery Lecture Notes in Computer Science (2010): 117-29. Web. Apr. 21, 2016.

Lu, Andy. "SAP HANA Concurrency Control." SAP Community Network. Oct. 28, 2014. Web. Apr. 22, 2016. 4 pages. <http://scn.sap.com/docs/DOC-57101>.

Mumy, Mark. "SAP Sybase IQ 16.0 Hardware Sizing Guide." SAP Community Network. May 12, 2013. Web. Apr. 21, 2016. 25 pages. <http://www.sdn.sap.com/irj/scn/go/portal/prtroot/docs/library/uuid/c0836b4f-429d-3010-a686-c35c73674180?QuickLink=index&overridelayout=true&58385785468058>.

Ailamaki, et al., "Weaving Relations for Cache Performance," Proceedings of the the Twenty-Seventh International Conference on Very Large Data Bases, Sep. 11-14, Orlando, FL, Jan. 1, 2001.

Hector Garcia-Molina, et al., "Database Systems The Second Complete Book Second Edition—Chapter 13—Secondary Storage Management," Database Systems the Complete Book, second edition, Jun. 15, 2008.

\* cited by examiner

VERSIONED INSERT ONLY HASH TABLE FOR IN-MEMORY COLUMNAR STORES

TECHNICAL FIELD

The subject matter described herein relates to a versioned insert only hash table that supports concurrent reader and writer access for in-memory columnar stores.

BACKGROUND

With some columnar in-memory data stores, column values can be dictionary compressed. Such compression is such that each distinct value in a column is mapped to a unique integer value. This mapping is one-to-one. These integer values are sometimes referred to a value IDs or yids as shorthand for value identifiers. Associated to each column there is a vector of these yids which can referred to as a column data array or an index vector. For storage efficiency the yids in the vector can be packed so that only n-bits to represent the highest vid as each position in the vector is logically n-bits wide. For example if n is equal to 2, in the first 64 bits of the index vector, the yids for the first 32 rows in the column can be stored.

A hash table maps values of one domain (e.g., strings, etc) to values in another, possibly different domain (e.g., integers, etc.). Consider a column of type string and a hash table mapping string values to yids. Assuming the first value inserted into this column is "hello". This value can be identified within the column with vid 1. Let's assume the next value inserted is "hello world". This new value will have a vid of 2. To keep track of these mappings a hash table is used to specify where the keys are of type string and the values of type integer. This hash table can be used to determine when a string is being inserted into the column if there is already a vid assigned to it or not.

Hash tables are often used for certain operations such as recovery and for specialized columns that do not require sorting as is provided by column dictionaries. For example, hash tables can be used for each delta column to keep track of the top-N most common values in the column, where N is typically a small value (e.g., the top 10). Regardless, when hash tables are used, both readers and writers need to concurrently access the hash table.

SUMMARY

In one aspect, at least one read operation is concurrently performed with at least one write operation that each insert a key/value pair into a backing array of a backing hash table of a hash table forming part of a columnar in-memory database. The backing array maps a plurality of pointers each to a respective bucket. Each bucket includes at least one state bit and a hashed value of a corresponding key. Thereafter, for each write operation, a first available position in the backing array at which a pointer to a new bucket containing the key/value pair can be inserted is iteratively determined (such that each first available position has no corresponding pre-existing pointer). Subsequently, for each write operation, the pointer to the new bucket containing the key/value pair is inserted at the corresponding first determined position in the backing array.

In some implementations, a hash function can be applied to the key. A first position in the backing array can be identified by applying a modulo operation to a size of the backing array to the result of the hash function. It can be checked if there is already a pointer at a specified position.

A new bucket can be created if there is not already a pointer at the specified position. The new bucket can encapsulate at least one state bit indicating that the bucket is not overflown, and the key/value pair. Further, an iterative process can be implemented that includes (i) marking the at least one state bit for the bucket corresponding to the specified pointer at the most recent position as overflown if there is already a pointer at the specifying position and (ii) identifying a different position in the backing array as an alternative to the last specified position until such time that a position is identified that does not have a pointer. Identifying a different position in the backing array can use a compare-and-swap (CAS) technique to attempt to establish the pointer in the different position. It can be checked to determine whether there is already a pointer at the different position. If not, a new bucket can be created that encapsulates (i) at least one state bit indicating that the bucket is not overflown, and (ii) the key/value pair. The iterative identification and marking can continue for a pre-determined number of times (i.e., cycles). A size of the backing array can be increased at such time that the pre-determined number of times is exceeded.

It can be determined, for at least one write operation, that the key is already in the hash table. In such cases, a caller of the write operation can be notified that the key is already in the hash table.

The write operations can include executing a write functor. A semaphore can be associated with each has table. The semaphore can be assigned to a single write operation. The semaphore can be released after execution of the write functor. Subsequent write operations can wait for the semaphore assigned to an earlier write operation to be released. A write functor by a subsequent write operation on the backing array can be executed once the write operation receives the sempahore.

A reader operation can access a backing hash table that is not deallocated while the reader operation accesses the backing hash table. Such backing hash table can be maintained while the reader operation continues to access the backing hash table even if a new backing hash table is established by a writer operation.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides an efficiently accessed hash table that can be concurrent accessed by both writer and reader operations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
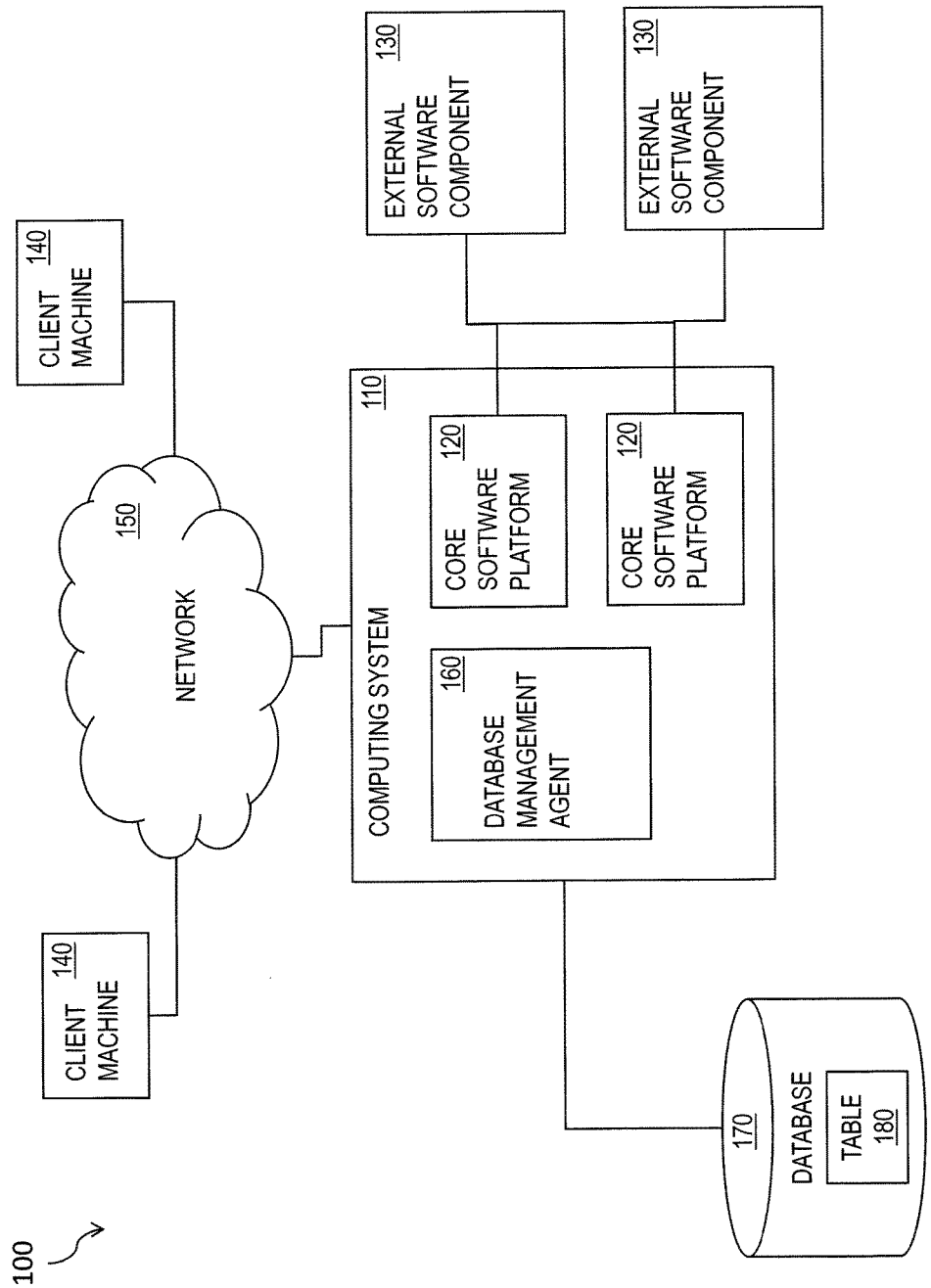
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
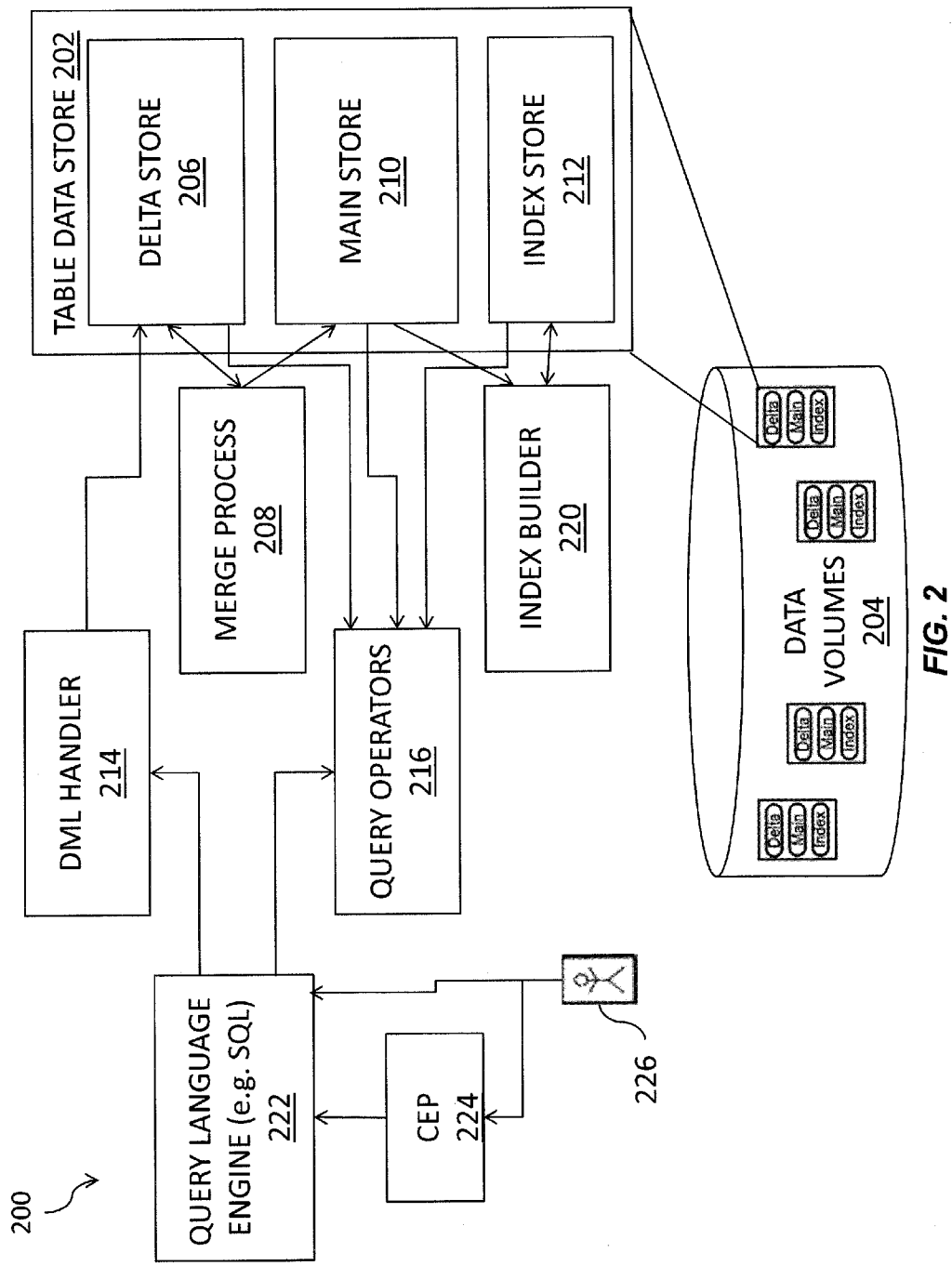
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
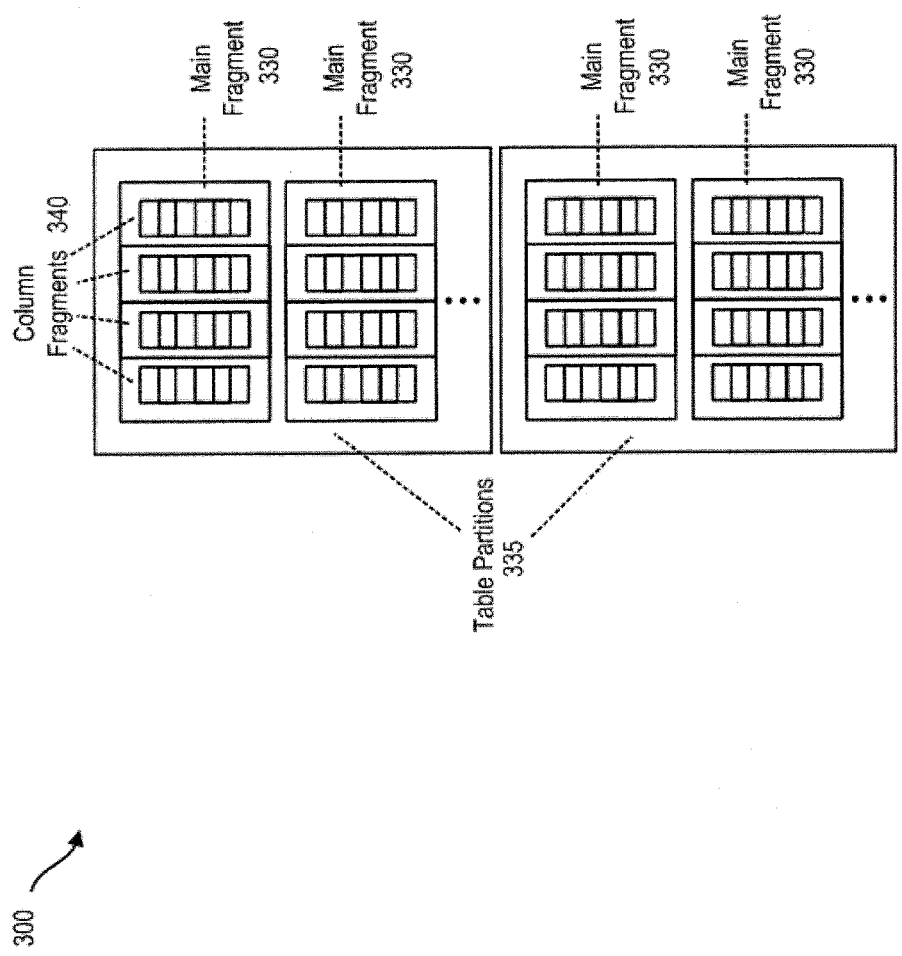
FIG. 3 is a schematic representation of fragments stored in a main store.

To achieve a best possible compression and also to support very large data tables, a main part of the table can be divided into one or more fragments. FIG. 3 shows a schematic representation of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
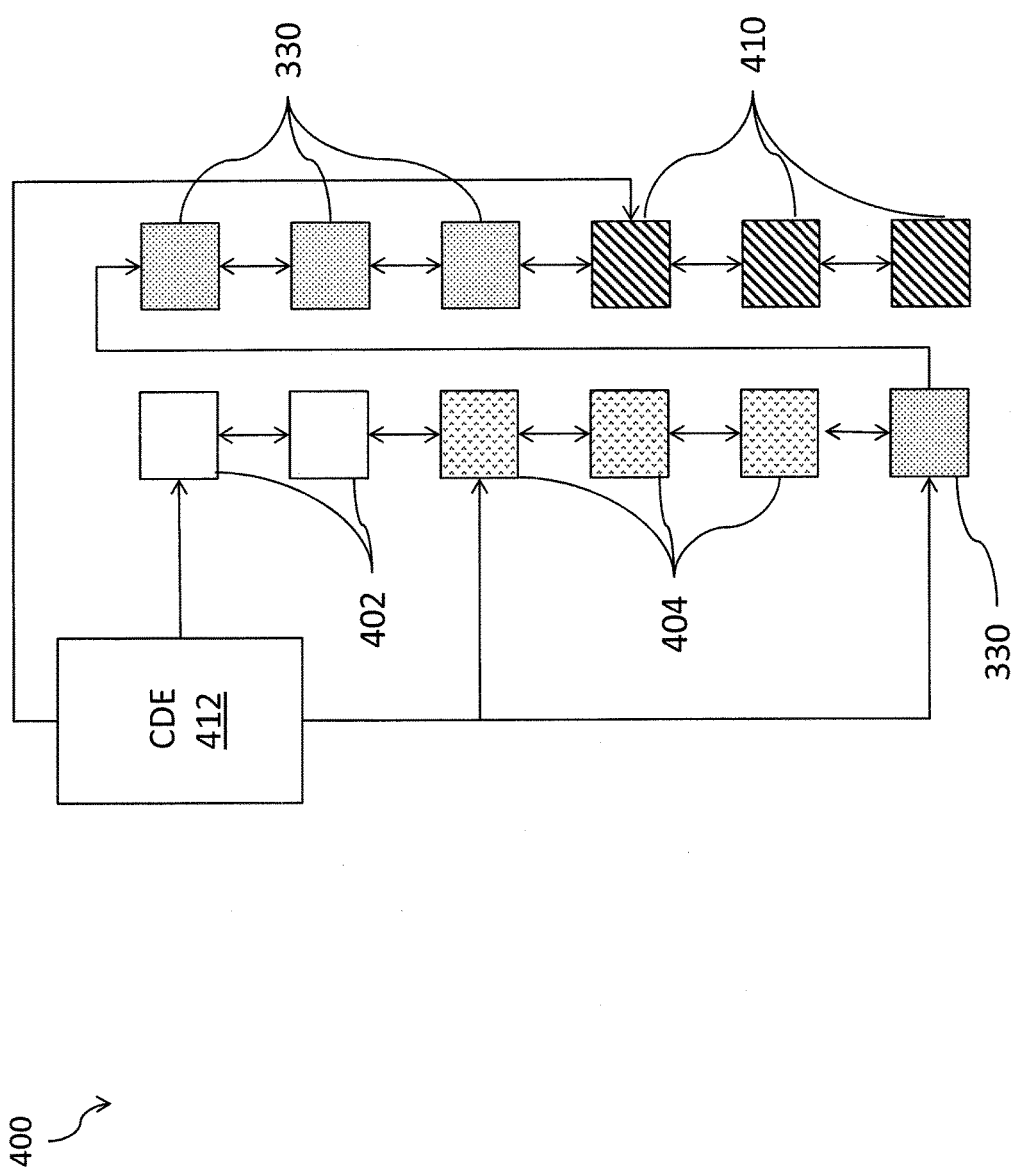
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
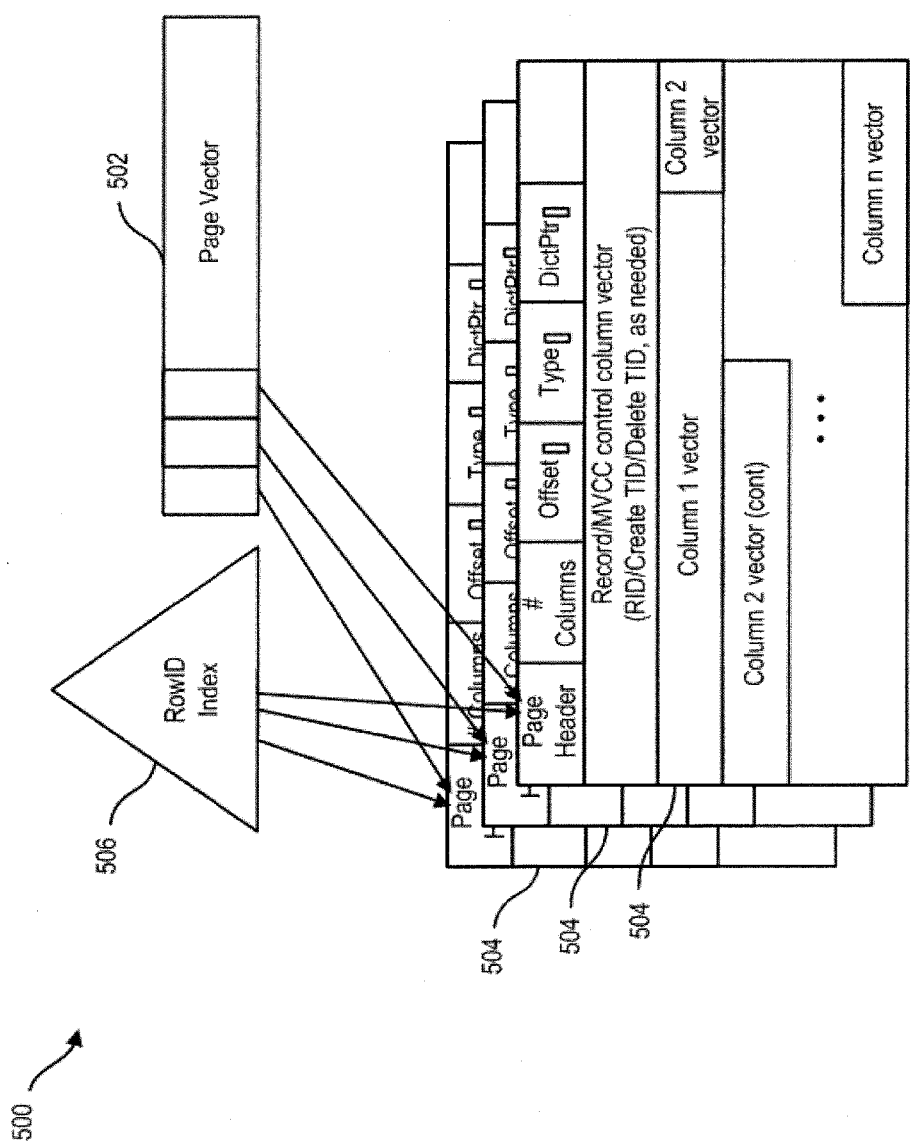
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
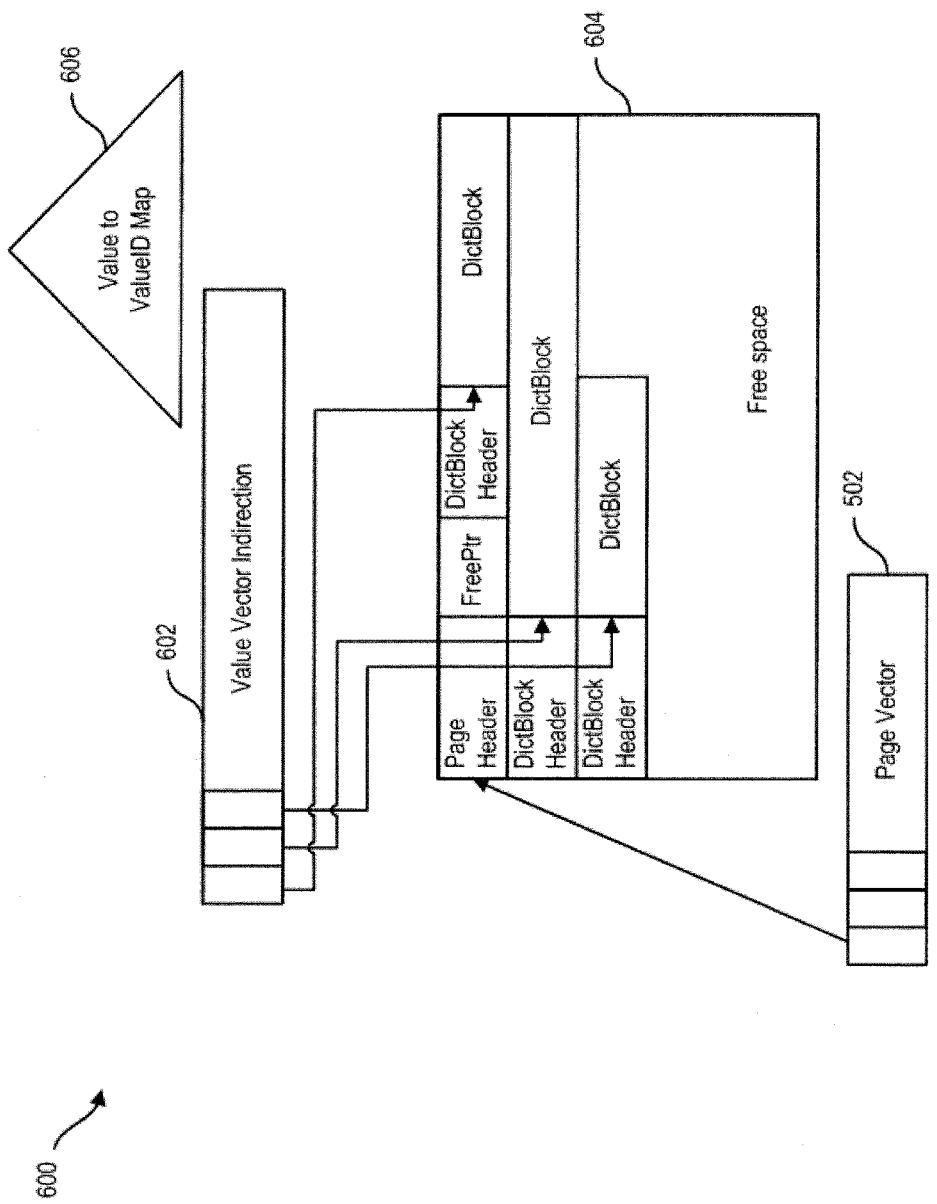
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 602 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
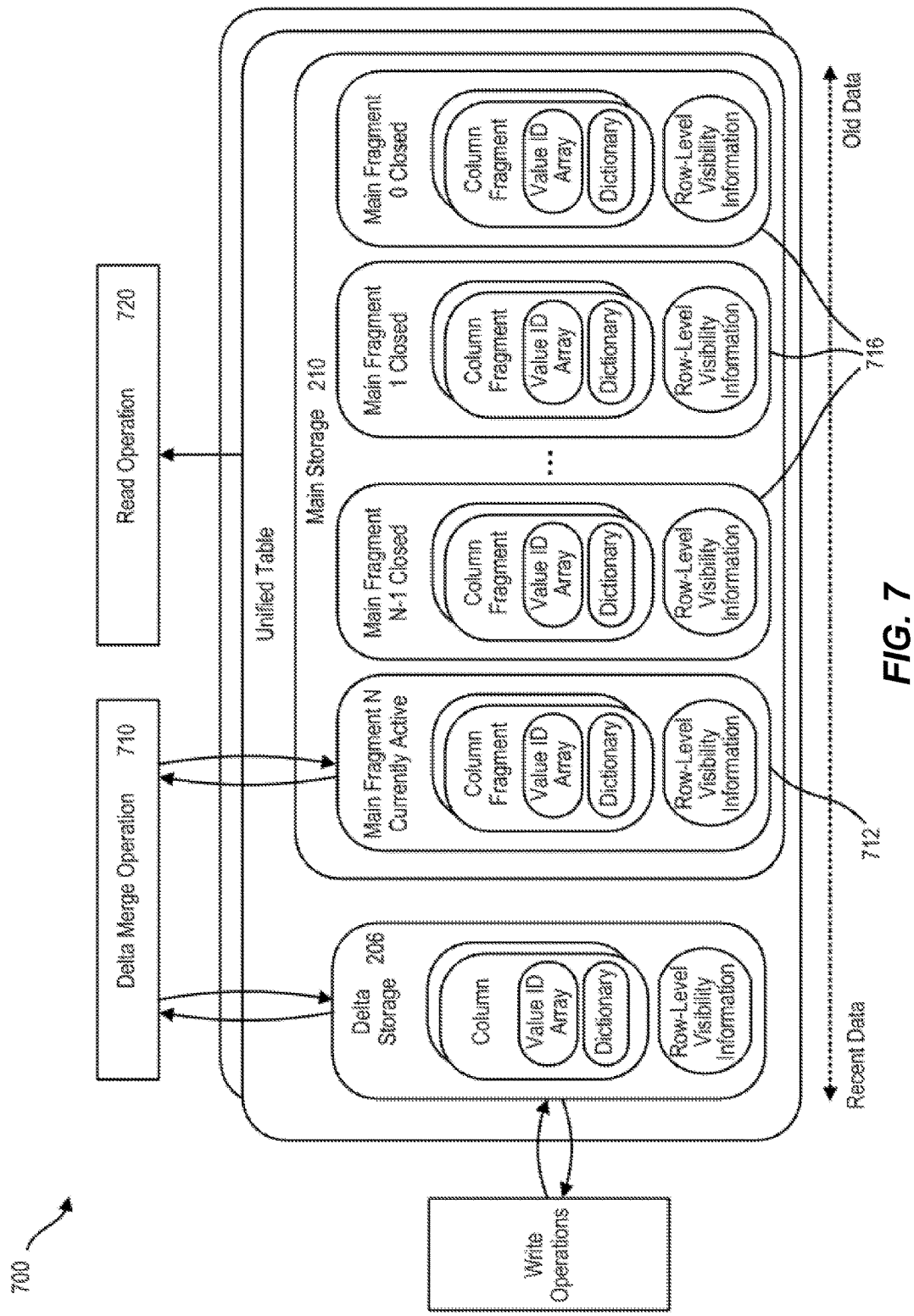
FIG. 7 is a functional block diagram illustrating performing a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
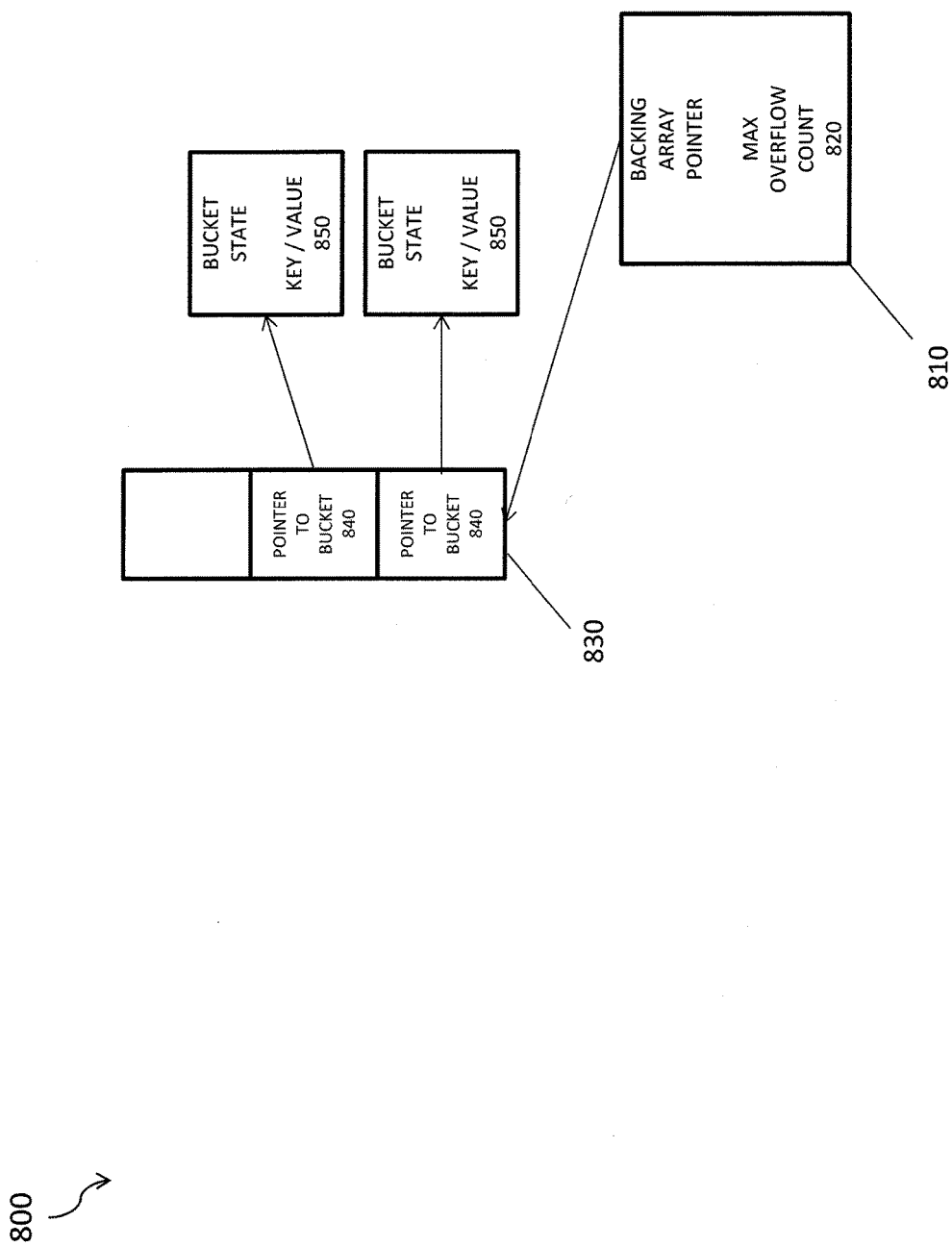
FIG. 8 is a diagram illustrating an index vector with a first backing array and a second backing array.

With reference to diagram 800 of FIG. 8, a hash table 810 is a pointer to a backing hash table data structure 820 containing a max overflow count and a pointer to a backing array 830 that in turn includes a plurality of pointers 840 to buckets 850. The backing array 830 is a chunk of memory in which the pointers to buckets are maintained. The backing array 830 can, in some cases, be of fixed memory. When the backing array 830 of the backing hash table (sometimes referred to as a first backing hash table) becomes full, a new backing hash table 820 with a new backing array 830 (of bigger size and possibly greater max overflow count) is allocated and the old backing hash table 820 is replaced with the new one. For example, a new backing hash table can be allocated when all available positions for bucket pointers 840 in the backing array 830 have been filled. Each bucket pointer 840 can point to a bucket 850 which, in turn, includes at least one state bit and a key/value pair.

The heuristic to decide the size of the new backing array 830 of a new backing hash table 820 can be changed on a per hash table instance. The new backing hash table can be configured to always have a backing array of more capacity than the one it is replacing (as the delta store is insert-only and it is only being appended to), and the decision of how big the new backing array can be based on the current size of the backing array 830 as well as max overflow count that will be used in the new backing hash table.

As there can be concurrent readers and writers accessing the hash table 810 while the new backing hash table 820 is being established, such readers and writers need to be prevented from accessing an old backing hash table 820 that has been de-allocated (as this would cause data corruption or a crash).

In order to allow concurrent writers and readers, the database 170 can utilize versioned data structures. The database 170 can use a garbage collector (GC) mechanism that controls access and changes to the versioned data structures such as the hash table 810. The GC can keep a counter of the number of modifications done to any of the versioned data structures it is in charge of (there is only one number irrespectively of the number of versioned data structures; there can be a GC per table). The GC only needs to know of structural changes. In the case of the hash table the only structural change is the establishment of a new backing hash table. Insertion of a new key value pair when there is no need to establish a new backing hash table is not considered a structural change. Hence, it is necessary for writers that made structural changes to notify the GC. Each structural change in any of the versioned data structures the GC controls causes the increment of the modification counter by one. The actual mechanism for notification of structural changes consists on physically giving the GC the old backing hash table 820 that is being replaced. The GC then increment the modification counter and it will only destroy the old backing hash table 820 when it is sure there are no readers that may potentially access the old backing hash table 820.

Before readers access the hash table 810, they can obtain a handle from the GC. The GC keeps track of the value of the modification counter at the time each reader obtained its handle. When the readers are done accessing hash tables 810 they destroy the handle that was provided by the GC. This destruction of the reader handle triggers a check by the GC which decides if there are no more readers with handles that were obtained at a modification counter less or equal than the reader handle being destroyed. If this is the case the GC can destroy all backing hash tables that were provided to the GC for destruction at the time its modification counter was less or equal the counter at the time of creation of the reader handle being destroyed.

There is no guarantee neither for readers nor writers that they will be accessing the most recent backing hash table 820. For readers this is typically not an issue. The reason is that in databases these read accesses are related to a transaction being executed (for example a select on a table). Rows that have been inserted after the read started should not be visible to the reader transaction anyways. On the other hand, readers may see data that has been inserted into the hash table after they started their reads. In this case there are MVCC (multi-version concurrency control) mechanisms in upper layers that filter out from the results of the query any yids for rows that the transaction should not see.

Figure 9:
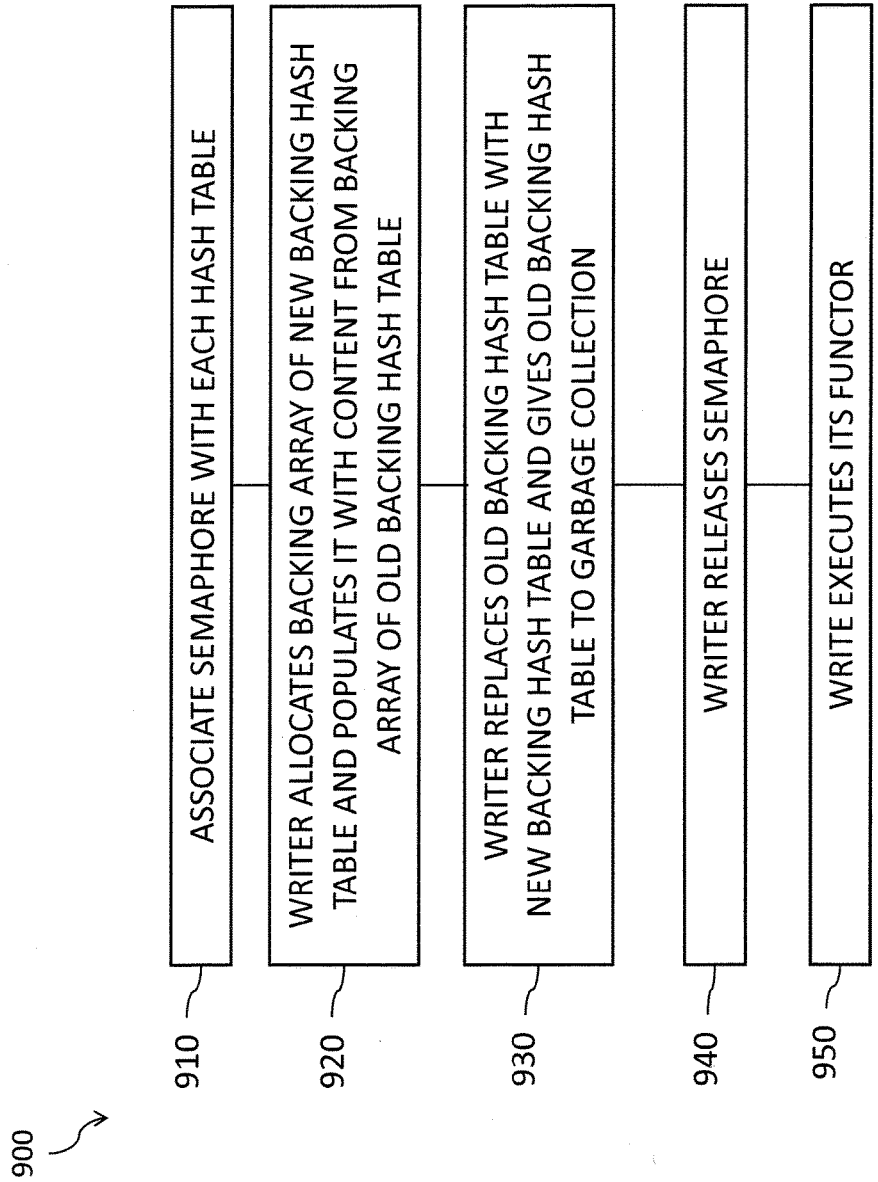
FIG. 9 is a process flow diagram illustrating the use of a semaphore by writers.

When a write produces a structural change, the following steps can be taken. With reference, to diagram 900 of FIG. 9, first, at 910, a synchronization object called a semaphore can be associated with each hash table 810. On structural changes the writer needing to establish a new backing hash table takes this semaphore. At most one writer can have the semaphore at a given time. If it cannot obtain the semaphore the writer waits. It can be assumed that the writer can immediately obtain the semaphore.

Second, at 920, the writer can allocate a backing array 830 of a new backing hash table and populate it with content from the backing array of the old backing hash table 820. This copying of the contents from the old backing hash table 820 may imply storing key value pairs in buckets at positions in the new backing array 830 different than the positions in the backing array of the old backing hash table. Notice other writers that did not need to establish a new backing hash table may still be operating on the old backing hash table 820 and they may be inserting at positions that this structural writer has already processed when copying into the backing array 830 of the new backing hash table 820. It must be guaranteed that these writes are not lost.

Next, at 930, the writer can replace the old backing hash table 820 with a new backing hash table and give the old backing hash table 820 to garbage collection. The writer can then, at 940, release its previously obtained semaphore. Writers waiting on the semaphore can then be awoken. The writer can then, at 950, execute (i.e., invoke, etc.) its write functor.

A writer that does not need to establish a new backing hash table can just execute its write functor. The execution of the write functor itself is as follows (and as illustrated in diagram 1000 of FIG. 10).

First, at 1010, the write operation on the old backing hash table 820 can be executed. Thereafter, at 1020, the semaphore for any writer that may be producing structural changes (i.e. establishing a new backing hash table 820) is waited on.

Next, at 1030, any waiting writers may be awakened. Awakened in this regard refers to notifying writers that the semaphore has been released whether such writers are seeking to only execute a functor or if they are seeking to product structural changes (and thus require the semaphore). Thereafter, at 1040, the writer checks the current backing array; if the backing array matches the old backing array the writer acted upon, the write is then considered to be completed. If there were structural changes, the process starts again with execution of the write operation on the new (i.e., current, etc.) backing array 830 (to guarantee that the writer's insertions in the hash table 810 are not lost).

If a first writer producing structural changes cannot immediately obtain the semaphore but had to wait for it, it can be checked if another writer established a new backing array 830 during such time period (i.e., while the writer is waiting for the semaphore) that has enough capacity and the max overflow count—and hence no further backing array is needed for the first writer. In such a case, the first writer would then execute its functor using the established new backing array 830.

It will be appreciated that the semaphore is only one example and that other types of exclusion mechanisms can be used such as mutexes (locks) and spinlocks. For example, an exclusion mechanism can ensure that only one writer is performing structural changes to a backing array at a given time. Furthermore, the exclusion mechanism can be implemented to allow other writers interested in making structural changes to the backing array to wait for the structural writer owning the exclusion mechanism. Once the structural writer owning the exclusion mechanism releases the mechanism, only one waiting structural writer can assume ownership of the mechanism. Other structural writers can keep waiting until they obtain ownership of the exclusion mechanism. Still further, a writer can query the mechanism to either obtain ownership of the exclusion mechanism (if it is available) or to be put to sleep until the exclusion mechanism becomes available to such writer (e.g., after the exclusion mechanism is released by a writer making structural changes, etc.). In addition, the exclusion mechanism can allow non-structural writers to wait on the exclusion mechanism for the structural writer that owns the mechanism to release it. It should be noted that non-structural writers do not assume ownership of the mechanism, they simply do not wait anymore once the structural writer releases the exclusion mechanism.

One type of read access is provided. Given a key (e.g., "hello") the associated value identifier (e.g. "1"), can be returned if the given key is in the hash table. Otherwise an invalid value provided at hash table creation is returned to indicate that the key was not found.

Referring again to FIG. 8, the current subject matter utilizes a versioned data structures framework for a hash table. The versioned hash table can also be referred to as a backing hash table 820, which contains a pointer to a chunk of memory and a maximum overflow count. The chunk of memory is an array 830 of pointers 840 to buckets 850. A bucket 850 as referred herein can contain a state which can, for example, be 64 bits. With this example, one bit can be used to indicate if the bucket 850 has overflown or not; the remaining 63 bits are the hashed value of the key in the bucket (more on this later).

Besides the bucket state, the key (e.g. "hello") can also be stored and associated value (e.g., 1) in the bucket 850. Pointers 840 to buckets 850 can be provided in the backing array 830 of the backing hash table 820 (rather than the buckets themselves) so that, when writing into a position of the backing array 830 of the backing hash table 820, readers can either see an empty position or a used position. This arrangement can require an atomic read and atomic write into the position. These atomic reads and writes are typically only guaranteed when the amount of data written or read matches the processors' word size (generally 64 bits). The current buckets are larger than 64 bits.

To insert into the bucket 850, a hash function can be first applied to the key being inserted. This results in, for example, a 64 bit number that can be used to identify the position in the backing array 830 where the bucket 850 that will contain the key/value pair will be. A modulo of the size of the backing array 830 to the result of the hash function can be applied to identify this position. Once the position has been identified, it can be checked whether there is already a bucket pointer 840. If not, a bucket 850 can be created and populated with the key/value pair being inserted. In addition, the bucket state can be accordingly set (i.e., not overflown, and key hash set to the first 63 bits of the hashed key value, etc.).

Using compare and swap (CAS) (i.e., an atomic instruction used in multithreading to achieve synchronization by comparing the contents of a memory location to a given value and, only if they are the same, modifying the contents of that memory location to a given new value), it can be attempted to establish the pointer into that position. If the pointer can be established into that position, no further action is required (except, in some cases, to ensure that there are no in-flight resizes of the backing array). If the pointer cannot be established into that position (because of an earlier write at such position), the bucket 850 of the writer that earlier established such position can be marked as overflowed. Next, an operation can be applied (e.g., add a fixed number, currently 31) to look for a next bucket to use. If this position is empty, a compare and swap operation can be performed for the bucket. If this position is already taken, again the bucket 850 in that position can be marked as overflowed and again, an operation (e.g., adding the fixed number 31) can be performed to get the next bucket. If the capacity of the backing array 830 is exceeded, the backing array's size can be subtracted from the position and a new position in the backing array 830 can be sought.

The attempt to find an empty position in the backing array 830 for the new bucket 850 can be limited to a maximum number of times (max overflow count) until such time that it is determined that a new backing hash table 820 with bigger backing array 830 is required (the initial max overflow count can be an optional parameter that the creator of the hash table provides when the hash table is first created; default is 4). The technique of adding 31 (or other number) when a position is already used and resizing after so many tries can be referred to as an open addressing hash table.

If it is determined that a particular value for insertion is already in the hash table (i.e., the backing array 830), the writer can simply be informed of the insert operation.

When looking for a value associated to a given key, the hash function can be applied to the key and a modulo operation can be applied with the backing array's size to identify the position where the pointer 840 to the bucket 850 containing the value should be. If there is no pointer 840 to a bucket 850 at that position, the process can be terminated because the key is not in the hash table. If there is a valid bucket pointer 840, the hashed value of the key that is being sought can be checked with the hashed key value in the bucket state (e.g., the first 63 bits can be checked). If there is a match, the given key can be compared with the key in the bucket 850. If there is a match the search has successfully complete since the key has been found and the value associated to the key in the bucket 850 can be returned. If the hashed key values do not match or the keys do not match, the bucket state can be checked to see if it is overflown. If not, then the key is not in the hash table. If it is overflown, then an integer can be added (e.g., 31) and the insertion attempt can be repeated for the bucket 850 at the resulting position. The looking up for a new bucket 850 can be terminated after a pre-defined number of positions are checked (this can be determined by the max overflow count associated to the backing hash table 820). The number of tries can be the same number that is used when inserting and deciding that whether to establish a new backing hash table 820.

As noted above, it is desirable to have concurrent readers and writers. For readers if a key is not found, it is not guaranteed that the key was not added by a concurrent writer while the read was executing. For writers, it must be guaranteed that insertions into the hash table are not lost.

Writer functionality can be encapsulated into "write functors". Write functors can be encoded in functional units that can be repeatedly invoked by writers. Write functors can ensure that no write operations are lost.

A write functor can be provided to insert a key value pair into the hash table.

Figure 10:
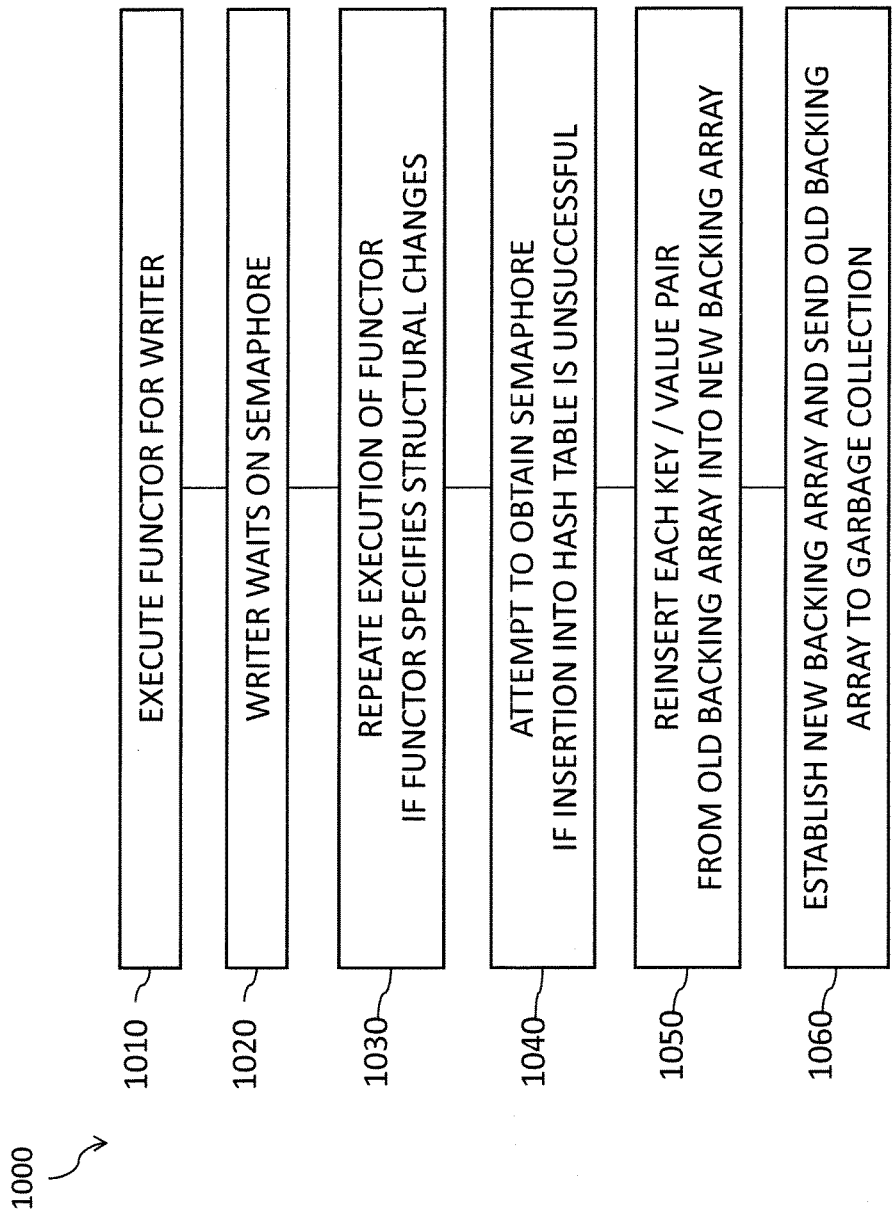
FIG. 10 is a process flow diagram illustrating the execution of a write functor.

With reference to diagram 1000 of FIG. 10, at 1010, writers can execute their corresponding functor. The functor can try to insert the key/value pair into the hash table. Two outcomes are possible: the functor succeeds (either because it inserted the key/value pair into the hash table or because the key was already in the hash table), or the functor found all positions it tried in the backing array already used.

If, at 1020, the writer's functor succeeded and this was a new key, the writer can wait on the semaphore for any writer that may be producing structural changes (i.e., establishing a new backing array).

If, at 1030, there were structural changes, the writer can execute its functor again (this guarantees the insertions by the writer into the hash table are not lost).

If, at 1040, the insert into the hash table was not successful, the writer can attempt to obtain the semaphore (in order to attempt to establish a new backing array). If the writer had to wait for the semaphore, the writer can execute its functor once again. If the writer immediately obtained the semaphore (i.e. there were no other writers trying to establish a new backing array), a new, larger backing hash table can be allocated (e.g., a backing array X% larger than the previous one, etc.)

The writer can then, at 1050, re-insert each key/value pair found in the old backing array into the new backing array because bucket positions will change.

Thereafter, at 1060, a new backing hash table can be established (i.e. at this point this new backing hash table becomes the hash table's backing hash table) with the old backing hash table can be given to the garbage collector, a signal can be given to writers waiting for the semaphore, and the process can be repeated from 1010. If the key/value pair still cannot be inserted after a number of resizes, then a new backing hash table 820 can have a max overflow count that corresponds to 1+the previous backing hash table's overflow count.

Figure 11:
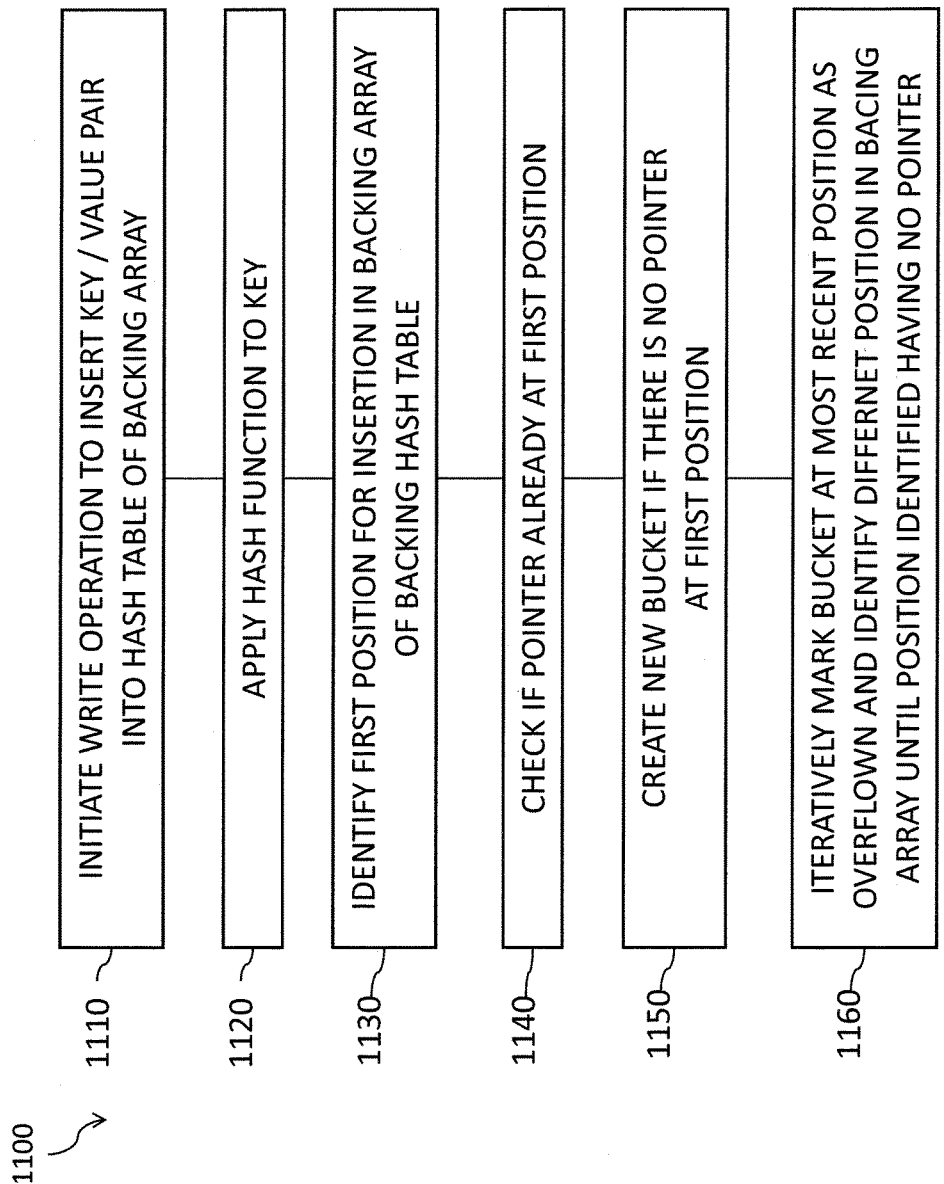
FIG. 11 is a first process flow diagram illustrating concurrent read and write operations.

FIG. 11 is a diagram 1100 in which, at 1110, a write operation is initiated to insert a key/value pair into a hash table forming part of a columnar in-memory database. The backing array of the backing hash table of the hash table maps a plurality of pointers each to a respective bucket. Each bucket includes at least one state bit and a hashed value of a corresponding key. Thereafter, at 1120, a hash function is applied to the key. In addition, at 1130, a first position for insertion into the backing array of the backing hash table by applying a modulo operation to a size of the backing array to the result of the hash function. Subsequently, at 1140, it can be checked whether there is already a pointer at a specified position. If not, at 1150, a new bucket is created that encapsulates at least one state bit indicating that the bucket is not overflown and the key/value pair. Otherwise, at 1160, an iterative process begins that include marking the bucket corresponding to the specified pointer at the most recent position as overflown if there is already a pointer at the specifying position and identifying a different position in the backing array as an alternative to the last specified position until such time that a position is identified that does not have a pointer.

Figure 12:
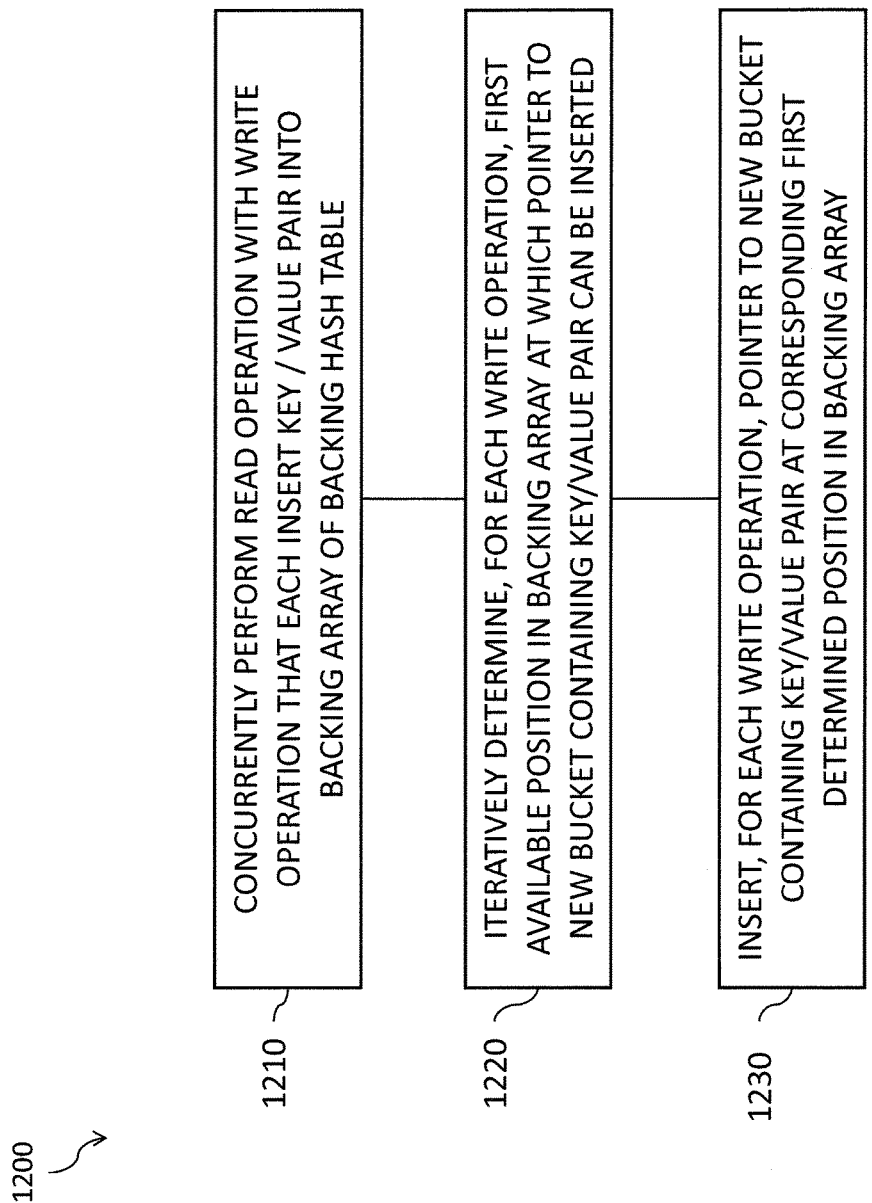
FIG. 12 is a second process flow diagram illustrating concurrent read and write operations.

FIG. 12 is a diagram 1200 in which, at 1210, at least one read operation with at least one write operation that each insert a key/value pair into a backing array of a backing hash table of a hash table forming part of a columnar in-memory database, the backing array mapping a plurality of pointers each to a respective bucket, each bucket comprising at least one state bit and a hashed value of a corresponding key. Thereafter, at 1220, for each write operation, a first available position in the backing array at which a pointer to a new bucket containing the key/value pair can be inserted is iteratively determined (such that each first available position has no corresponding pre-existing pointer). Subsequently, at 1230, for each write operation, the pointer to the new bucket containing the key/value pair is inserted at the corresponding first determined position in the backing array.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
concurrently performing at least one read operation with at least one write operation that each insert a key/value pair into a backing array of a backing hash table of a hash table forming part of a columnar in-memory database, the backing array mapping a plurality of pointers each to a respective bucket, each bucket comprising at least one state bit and a hashed value of a corresponding key;
iteratively determining, for each write operation, a first available position in the backing array at which a pointer to a new bucket containing the key/value pair can be inserted, each first available position having no corresponding pre-existing pointer, the iteratively determining comprising:
identifying a candidate position in the backing array for the bucket containing the key/value pair by applying a modulo operation of the size of the backing array to a hash of the key determined using the hash table,
iteratively, until the candidate position does not have a pre-existing pointer, (i) marking the at least one state bit for the bucket corresponding to the candidate pointer as overflown and (ii) identifying a next candidate position in the backing array, and
creating a new bucket for the candidate position that does not have a pre-existing pointer, the new bucket encapsulating at least one state bit indicating that the bucket is not overflown, and the key/value pair; and
inserting, for each write operation, the pointer to the new bucket containing the key/value pair at the corresponding first determined position in the backing array.

2. The method of claim 1, wherein the identifying the next candidate position in the backing array uses a compare-and-swap (CAS) technique to attempt to establish the pointer in the different position.

3. The method of claim 1 further comprising:
checking if there is already a pointer at the next candidate position;
creating a new bucket if there is not already a pointer at the next candidate position, the new bucket encapsulating (i) at least one state bit indicating that the bucket is not overflown, and (ii) the key/value pair.

4. The method of claim 1, wherein the iteratively identifying and marking continues for a pre-determined number of times.

5. The method of claim 1, wherein a size of the backing array is increased at such time that the pre-determined number of times is exceeded.

6. The method of claim 1 further comprising:
determining, for at least one write operation, that the value is already in the hash table; and
notifying a caller of the write operation that the value is already in the hash table.

7. The method of claim 1, wherein the at least one write operation comprises executing a write functor.

8. The method of claim 7 further comprising:
associating a semaphore with each hash table; and
assigning the semaphore to a single write operation.

9. The method of claim 8 further comprising:
releasing the semaphore after execution of the write functor.

10. The method of claim 9 further comprising:
waiting, by a subsequent write operation, the semaphore assigned to the write operation to be released; and
executing a write functor by the subsequent write operation on the backing array.

11. The method of claim 1 further comprising:
accessing, by a reader operation, a backing hash table, wherein the backing hash table is not deallocated while the reader operation accesses the backing hash table.

12. The method of claim 11, wherein the backing hash table is not deallocated if the reader operation continues to access the backing hash table and a new backing hash table is established by a writer operation.

13. A non-transitory computer program product storing instructions which, when executed by at least one data processor forming part of at least one computing device, result in operations comprising:
concurrently performing at least one read operation with at least one write operation that each insert a key/value pair into a backing array of a backing hash table of a hash table forming part of a columnar in-memory database, the backing array mapping a plurality of pointers each to a respective bucket, each bucket comprising at least one state bit and a hashed value of a corresponding key; and
iteratively determining, for each write operation, a first available position in the backing array at which a pointer to a new bucket containing the key/value pair can be inserted, each first available position having no corresponding pre-existing pointer, the iteratively determining comprising:
identifying a candidate position in the backing array for the bucket containing the key/value pair by applying a modulo operation of the size of the backing array to a hash of the key determined using the hash table,
iteratively, until the candidate position does not have a pre-existing pointer, (i) marking the at least one state bit for the bucket corresponding to the candidate pointer as overflown and (ii) identifying a next candidate position in the backing array, and
creating a new bucket for the candidate position that does not have a pre-existing pointer, the new bucket encapsulating at least one state bit indicating that the bucket is not overflown, and the key/value pair; and
inserting, for each write operation, the pointer to the new bucket containing the key/value pair at the corresponding first determined position in the backing array.

14. The computer program product of claim 13, wherein the at least one write operation comprises executing a write functor.

15. The computer program product of claim 14, wherein the operations further comprise:
associating a semaphore with each hash table; and
assigning the semaphore to a single write operation.

16. The computer program product of claim 15, wherein the operations further comprise:
releasing the semaphore after execution of the write functor.

17. The computer program product of claim 16, wherein the operations further comprise:
waiting, by a subsequent write operation, the semaphore assigned to the write operation to be released; and
executing a write functor by the subsequent write operation on the backing array.

18. A system comprising:
an in-memory database comprising:
at least one processor; and
memory storing instructions which, when executed by the at least one data processor, result in operations comprising:
concurrently performing at least one read operation with at least one write operation that each insert a key/value pair into a backing array of a backing hash table of a hash table forming part of a columnar in-memory database, the backing array mapping a plurality of pointers each to a respective bucket, each bucket comprising at least one state bit and a hashed value of a corresponding key;
iteratively determining, for each write operation, a first available position in the backing array at which a pointer to a new bucket containing the key/value pair can be inserted, each first available position having no corresponding pre-existing pointer, the iteratively determining comprising:
identifying a candidate position in the backing array for the bucket containing the key/value pair by applying a modulo operation of the size of the backing array to a hash of the key determined using the hash table,
iteratively, until the candidate position does not have a pre-existing pointer, (i) marking the at least one state bit for the bucket corresponding to the candidate pointer as overflown and (ii) identifying a next candidate position in the backing array, and
creating a new bucket for the candidate position that does not have a pre-existing pointer, the new bucket encapsulating at least one state bit indicating that the bucket is not overflown, and the key/value pair; and
inserting, for each write operation, the pointer to the new bucket containing the key/value pair at the corresponding first determined position in the backing array.

19. The system of claim 17, wherein the at least one write operation comprises executing a write functor, and wherein the operations further comprise:
associating a semaphore with each hash table;
assigning the semaphore to a single write operation;

waiting, by a subsequent write operation, the semaphore assigned to the write operation to be released;

releasing the semaphore after execution of the write functor; and executing a write functor by the subsequent write operation on the backing array.

* * * * *